(12) United States Patent
Yang et al.

(10) Patent No.: US 8,355,360 B2
(45) Date of Patent: Jan. 15, 2013

(54) METHOD AND APPARATUS FOR ALLOCATING DOWNLINK POWER IN AN ORTHOGONAL FREQUENCY DIVISION MULTIPLEXING COMMUNICATION SYSTEM

(75) Inventors: Weidong Yang, Schaumburg, IL (US); Fan Wang, Chicago, IL (US)

(73) Assignee: Motorola Mobility LLC, Livertyville, IL (US)

( * ) Notice: Subject to any disclaimer, the term of this patent is extended or adjusted under 35 U.S.C. 154(b) by 568 days.

(21) Appl. No.: 12/427,219

(22) Filed: Apr. 21, 2009

(65) Prior Publication Data

US 2009/0285169 A1 Nov. 19, 2009

Related U.S. Application Data

(60) Provisional application No. 61/053,113, filed on May 14, 2008.

(51) Int. Cl.
*H04B 7/185* (2006.01)
(52) U.S. Cl. ....................................... 370/318; 455/13.4
(58) Field of Classification Search .................. 370/318
See application file for complete search history.

(56) References Cited

U.S. PATENT DOCUMENTS

| | | | |
|---|---|---|---|
| 5,734,639 A * | 3/1998 | Bustamante et al. | 370/208 |
| 6,658,045 B1 | 12/2003 | Jin | |
| 7,272,190 B2 * | 9/2007 | Blankenship et al. | 375/260 |
| 7,289,574 B2 | 10/2007 | Parolari | |
| 7,746,766 B2 * | 6/2010 | Kowalski et al. | 370/208 |
| 2004/0066761 A1 * | 4/2004 | Giannakis et al. | 370/329 |
| 2004/0202256 A1 * | 10/2004 | Giannakis et al. | 375/267 |
| 2005/0135497 A1 * | 6/2005 | Kim et al. | 375/267 |
| 2006/0002414 A1 * | 1/2006 | Du et al. | 370/413 |
| 2006/0008020 A1 * | 1/2006 | Blankenship et al. | 375/261 |
| 2006/0034244 A1 | 2/2006 | Huang et al. | |
| 2006/0198460 A1 * | 9/2006 | Airy et al. | 375/267 |
| 2007/0207810 A1 * | 9/2007 | Cho et al. | 455/450 |
| 2008/0132173 A1 * | 6/2008 | Sung et al. | 455/67.13 |

FOREIGN PATENT DOCUMENTS

EP 1566917 A2 8/2005

OTHER PUBLICATIONS

Joo Heo et al.: "Effective adaptive transmit power allocation algorithm considering dynamic channel allocation in reuse partitioning-based OFDMA system", Wireless Personal Communications, Kluwer Academic Publishers, DO, vol. 43, No. 2, Apr. 6, 2007, pp. 677-684.
WiMAX Forum Mobile System Profile Release 1.0 Approved Specification (Revision 1.7.0: Sep. 18, 2008), all pages.
Baum, Kevin et al.: "Improved method for using EESM for CINR measurements", IEEE 802.16 Broadband Wireless Access Working Group <http://ieee802.or/16>, IEEE C802.16e-05/174r1, Mar. 14, 2005, all pages.

(Continued)

*Primary Examiner* — Derrick Ferris
*Assistant Examiner* — Gerald Smarth

(57) ABSTRACT

In an Orthogonal Frequency Division Multiplexing communication system, a radio access network allocates a transmit power for a downlink transmission to a mobile station based on a mean channel quality metric and a channel quality metric second order statistic, in various embodiments a channel quality metric variance or standard deviation, reported by the mobile station.

10 Claims, 3 Drawing Sheets

OTHER PUBLICATIONS

Abdi, A. and Kaveh, M.: "Performance comparison of three different estimators for the Nakagami m parameter using Monte Carlo Simulation", Communications Letters, IEEE, Apr. 12000, vol. 4, Issue 4, ISSN: 1089-7798, pp. 119-121.

Young-Chai Ko and Alouini, M.-S: "Estimation of Nakagami fading channel parameters with application to optimized transmitter diversity systems", IEEE Transactions on Wireless Communications, vol. 2, No. 2, Mar. 2003, ICCC 2001, IEEE International Conference, Helsinki, Finland, ISBN: 0-7803-7097-1, pp. 250-259.

3GPP TSG-RAN-1 Meeting #35, "Effective SIR Computation for WCDMA System-Level Simulations", Nov. 17-21, 2003, Lisboa, Portugal R1-03-1299 Nortel Networks, all pages.

Q.T. Zhang: "A Note on the Estimation of Nagagami-Fading Parameter", IEEE Communications Letters, vol. 6, No. 6, Jun. 2002, pp. 237-238.

* cited by examiner

METHOD AND APPARATUS FOR ALLOCATING DOWNLINK POWER IN AN ORTHOGONAL FREQUENCY DIVISION MULTIPLEXING COMMUNICATION SYSTEM

CROSS-REFERENCE TO RELATED APPLICATION

This application claims priority from provisional application Ser. No. 61/053,113, entitled "METHOD AND APPARATUS FOR ALLOCATING DOWNLINK POWER IN AN ORTHOGONAL FREQUENCY DIVISION MULTIPLEXING COMMUNICATION SYSTEM," filed May 14, 2008, which is commonly owned and incorporated herein by reference in its entirety.

FIELD OF THE INVENTION

The present invention relates generally to Orthogonal Frequency Division Multiplexing (OFDM) communication systems, and, in particular, to downlink scheduling in an OFDM communication system.

BACKGROUND OF THE INVENTION

The IEEE (Institute of Electrical and Electronics Engineers) 802.16 standards propose using Orthogonal Frequency Division Multiple Access (OFDMA) for transmission of data over an air interface. OFDMA has also been proposed for use in 3GPP (Third Generation Partnership Project) Evolution communication systems. In an OFDMA communication system, a frequency bandwidth is split into multiple contiguous frequency sub-bands, each sub-band comprising multiple sub-carriers, that are transmitted simultaneously. A user may then be assigned one or more of the frequency sub-bands for an exchange of user information, thereby permitting multiple users to transmit simultaneously on the different sub-carriers. These sub-carriers are orthogonal to each other, and thus intra-cell interference is minimized.

In order to maximize bandwidth usage, for any given Transmission Time Interval (TTI) the sub-bands may be allocated to users based on measured channel conditions. Further, an appropriate modulation scheme and coding scheme may be determined for each sub-band and each TTI based on the measured channel conditions. The channel condition measurements are performed by a mobile station (MS), which MS measures channel conditions, such as a Signal power over the Interference plus Noise Ratio (SINR) for a common pilot channel or on a preamble, for each and every sub-band during a measuring period, such as a Transmission Time Interval (TTI) (also known as a sub-frame) or a radio frame transmission period, and then reports an average of the measured channel conditions across all of the sub-bands to a serving Node B in a Channel Quality Information (CQI) message. Based on the reported average, or mean, SINR, an OFDMA communication system selectively schedules the sub-bands over a scheduling period, typically one or more TTIs or radio frames, and further adaptively determines appropriate modulation and coding schemes for each sub-band during the scheduling period.

However, reporting a mean STNR across all sub-bands may not describe the channel properly, especially with frequency selective fading channels. Therefore, it has been proposed, in U.S. patent application No. 61/050,284, to provide a second order statistic, such as a mean or standard deviation, for the SINR that will enhance the description of the channel conditions. However, currently no method exists for utilizing such an SINR second order statistic to provide enhanced power allocation for downlink transmissions in an OFDM communication system.

Therefore, a need exists for a method and apparatus that allocates downlink power in an OFDM communication system based on both an SINR second order statistic and a mean SINR.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method and an apparatus that allocates downlink power in an Orthogonal Frequency Division Multiplexing (OFDM) communication system based on both an SINR second order statistic and a mean SINR, a radio access network, operating in an OFDM communication system, allocates a transmit power for a downlink transmission to a mobile station (MS) based on a mean channel quality metric and a channel quality metric second order statistic, in various embodiments a channel quality metric variance or standard deviation, reported by the MS.

Generally, an embodiment of the present invention encompasses a method for providing channel quality feedback in an OFDM communication system wherein a frequency bandwidth is divided into a plurality of sub-bands, the method including receiving a mean channel quality metric and a channel quality metric second order statistic from an MS and allocating a transmit power for a downlink transmission to the MS based on the received mean channel quality metric and a channel quality metric second order statistic.

Another embodiment of the present invention encompasses an access network element operable in an OFDM communication system wherein a frequency bandwidth is divided into a plurality of sub-bands, the access network element configured to receive a mean channel quality metric and a channel quality metric second order statistic from an MS and to allocate a transmit power for a downlink transmission to the MS based on the received mean channel quality metric and a channel quality metric second order statistic.

Figure 1:
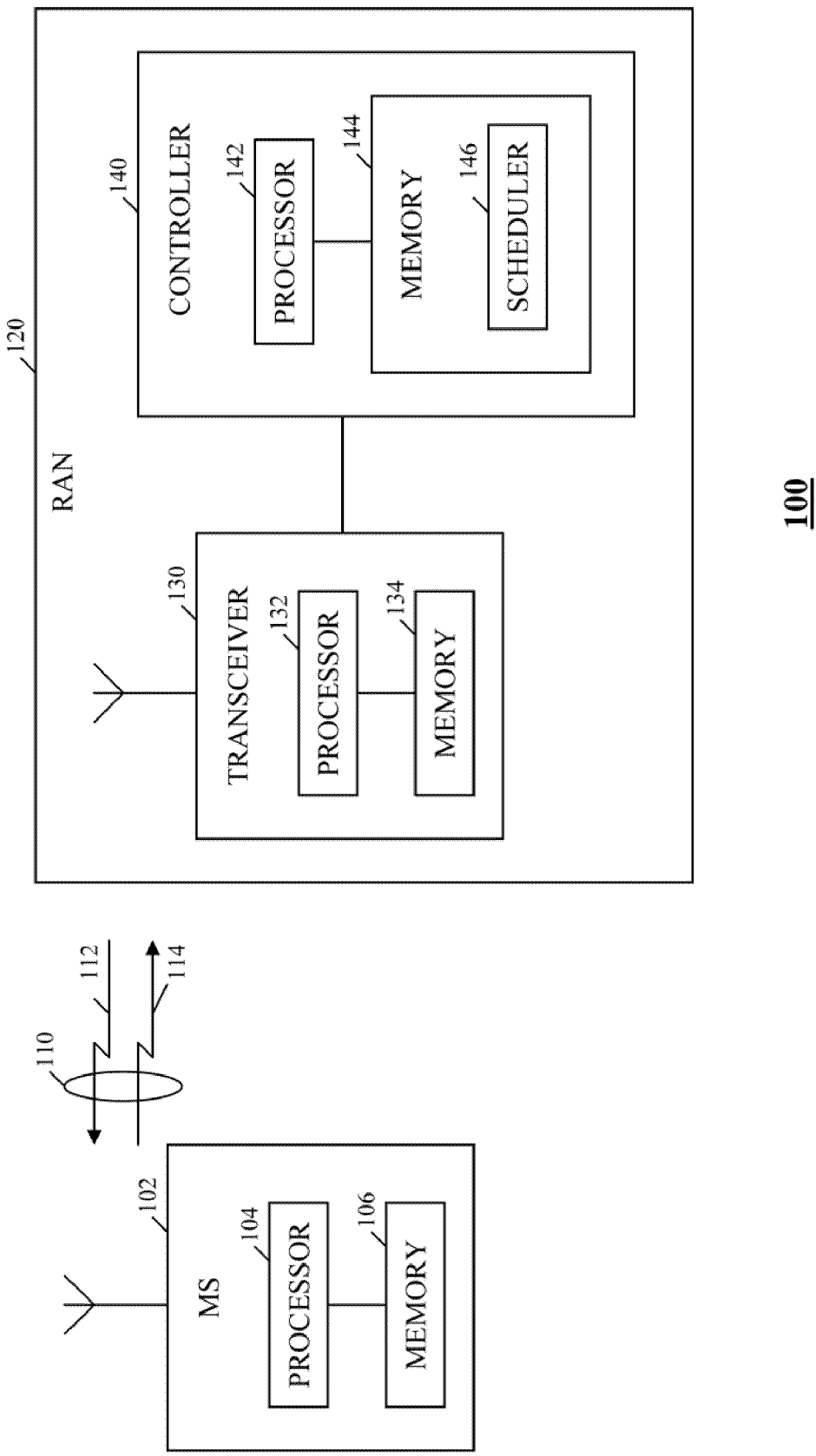
FIG. 1 is a block diagram of a wireless communication system in accordance with an embodiment of the present invention.

The present invention may be more fully described with reference to FIGS. 1-3. FIG. 1 is a block diagram of a wireless communication system 100 in accordance with an embodiment of the present invention. Communication system 100 includes at least one mobile station (MS) 102, such as but not limited to a cellular telephone, a radio telephone, a personal digital assistant (PDA), laptop computer, or personal computer with radio frequency (RF) capabilities, or a wireless modem that provides RF access to digital terminal equipment (DTE) such as a laptop computer. Communication system 100 further includes a Radio Access Network (RAN) 120 that provides communication services to mobile stations, such as MS 102, residing in a coverage area of the RAN via an air interface 110. Air interface 110 comprises a downlink 112 and an uplink 114. Each of downlink 112 and uplink 114 comprises multiple physical communication channels, including at least one signaling channel and at least one traffic channel.

RAN 120 includes a transceiver 130, such as a Node B or a Base Transceiver Station (BTS), in wireless communication with each MS, such as MS 102, serviced by the RAN and further includes an access network controller 140, such as a Radio Network Controller (RNC) or a Base Station Controller (BSC), coupled to the one or more transceivers. RAN 120 further includes a packet scheduler 146 that performs the scheduling functions described herein as being performed by the RAN. Each of transceiver 130, controller 140, and scheduler 146 when implemented by a network element separate from the transceiver and controller, may be referred to herein as an access network element of communication system 100.

Each of MS 102, transceiver 130, and controller 140 includes a respective processor 104, 132, and 142, such as one or more microprocessors, microcontrollers, digital signal processors (DSPs), combinations thereof or such other devices known to those having ordinary skill in the art. The particular operations/functions of processors 104, 132, and 142, and thus of MS 102, transceiver 130, and controller 140, is determined by an execution of software instructions and routines that are stored in a respective at least one memory device 106, 134, and 144, associated with the processor, such as random access memory (RAM), dynamic random access memory (DRAM), and/or read only memory (ROM) or equivalents thereof, that store data and programs that may be executed by the corresponding processor. Preferably, scheduler 146 is implemented in controller 140, and more particularly by processor 142 based on instructions maintained in at least one memory device 144. However, in other embodiments of the present invention, scheduler 146 may be implemented in transceiver 130, and more particularly by processor 132 based on instructions maintained in at least one memory device 134, or may be implemented by processor of, and based on instructions maintained in at least one memory device of, a network element separate from, and in communication with, one or more of transceiver 130 and controller 140.

The embodiments of the present invention preferably are implemented within MS 102, transceiver 130, and controller 140, and more particularly with or in software programs and instructions stored in the respective at least one memory device 106, 134, and 144, and executed by respective processors 102, 132, and 142 of the MS, transceiver, and controller. However, one of ordinary skill in the art realizes that the embodiments of the present invention alternatively may be implemented in hardware, for example, integrated circuits (ICs), application specific integrated circuits (ASICs), and the like, such as ASICs implemented in one or more of MS 102, transceiver 130, and controller 140. Based on the present disclosure, one skilled in the art will be readily capable of producing and implementing such software and/or hardware without undo experimentation.

Communication system 100 comprises a wideband packet data communication system that employs an Orthogonal Frequency Division Multiplexing (OFDM) modulation scheme for transmitting data over air interface 110. Preferably, communication system 100 is an Orthogonal Frequency Division Multiple Access (OFDMA) communication system, wherein a frequency bandwidth employed by the communication system is split into multiple frequency sub-bands, or Resource Blocks (RBs), during a given time period. Each sub-band comprises multiple orthogonal frequency sub-carriers over a given number of OFDM symbols, that are the physical layer channels over which traffic and signaling channels are transmitted in a TDM or TDM/FDM fashion. The channel bandwidth also may be sub-divided into one or more sub-band groups, or Resource Block Groups (RBGs), wherein each sub-band group comprises one or more sub-bands that may or may not be contiguous, and the sub-band groups may or may not be of equal size. A communication session may be assigned one or more sub-bands or sub-band groups for an exchange of bearer information, thereby permitting multiple users to transmit simultaneously on the different sub-bands such that each user's transmission is orthogonal to the other users' transmissions.

In addition, communication system 100 preferably comprises a Worldwide Interoperability for Microwave Access (WiMAX) communication system that operates in accordance with the IEEE (Institute of Electrical and Electronics Engineers) 802.16 standards, which standards specify wireless telecommunications system operating protocols, including radio system parameters and call processing procedures. However, those who are of ordinary skill in the art realize that communication system 100 may operate in accordance with any wireless telecommunication system employing an Orthogonal Frequency Division Multiplexing (OFDM) modulation scheme, such as a 3GPP (Third Generation Partnership Project) E-UTRA (Evolutionary UMTS Terrestrial Radio Access) communication system, a 3GPP2 (Third Generation Partnership Project 2) Evolution communication system, for example, an Ultra Mobile Broadband (UMB) communication system, a Wireless Local Area Network (WLAN) communication system as described by the IEEE 802.xx standards, for example, the 802.11a/HiperLAN2, 802.11g, or 802.20 standards, or any of multiple proposed ultrawideband (UWB) communication systems.

In order for RAN 120, and more particularly scheduler 146, to selectively schedule each MS, such as MS 102, served by the RAN for use of one or more sub-bands of a frequency bandwidth employed by communication system 100, RAN 120 provides each served MS with scheduling information for a scheduling period. The scheduling information may include, for example, a reference start time, preferably in units of radio frames such as a starting Cell System Frame Number (SFN) index or a starting Connection Frame Number (CFN) index, a scheduling duration, that is, a duration of a time period during which the provided scheduling information is applicable, for example, in units of radio frames or Transmission Time Intervals (TTIs), and an allocated sub-band. In turn, the scheduling information is based on channel quality information provided to the RAN by the served MSs. The scheduling information reported by each MS includes a mean channel quality metric for the frequency bandwidth and secondary statistical channel quality information comprising one or more of a standard deviation associated with a measured channel quality metric and a variance associated with the measured channel quality.

Figure 2:
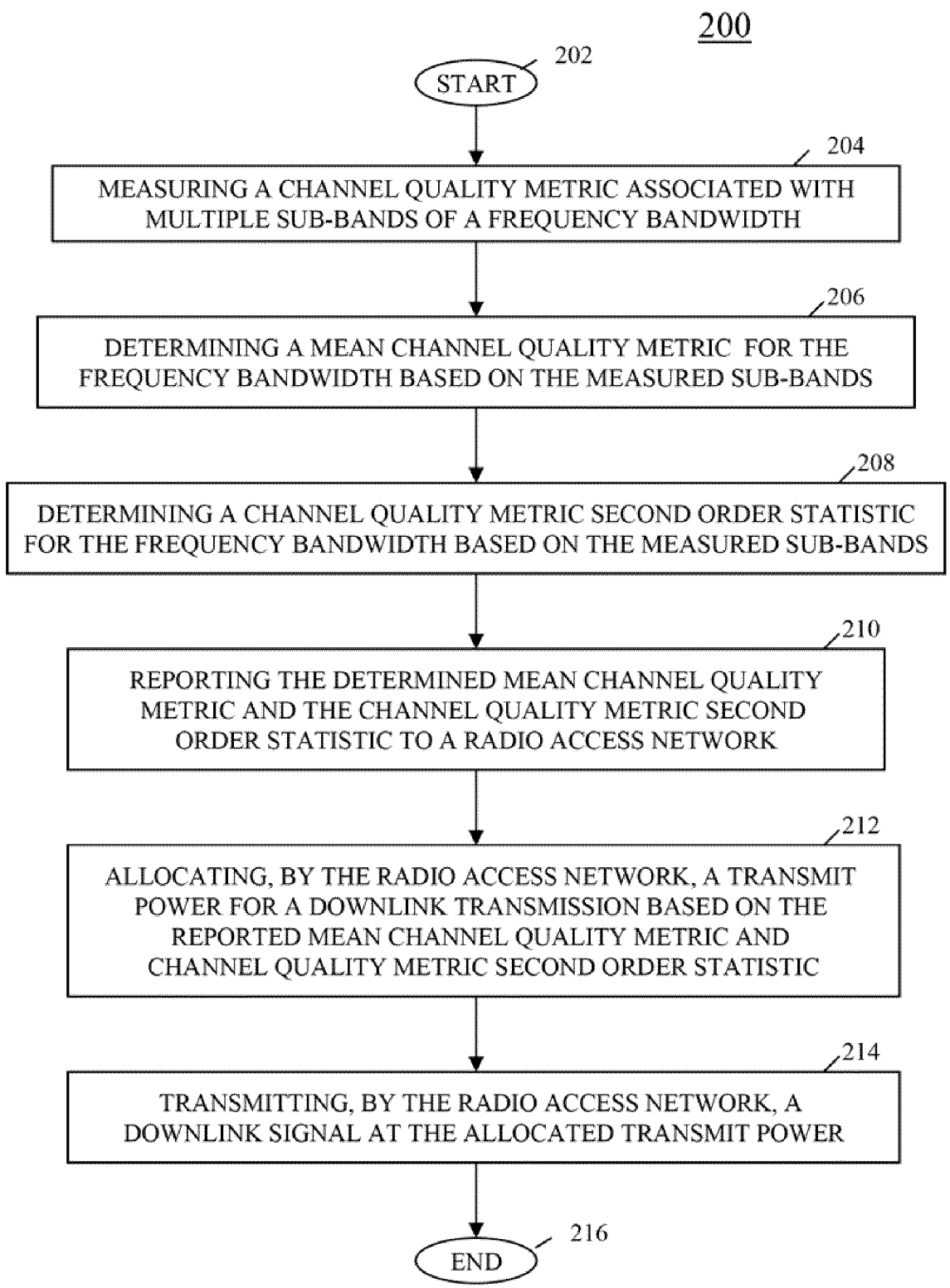
FIG. 2 is a logic flow diagram of a method for downlink power allocation executed by the communication system of FIG. 1 in accordance with an embodiment of the present invention.

Referring now to FIG. 2, a logic flow diagram 200 is provided that illustrates a method of downlink scheduling a MS by a serving RAN, that is, RAN 120 and preferably scheduler 146, in accordance with an embodiment of the present invention. Logic flow diagram 200 begins (402) when MS 102 measures (204) a channel quality metric, preferably measuring Channel Quality Information (CQI) as is known in the art, associated with each sub-band of multiple sub-bands of a frequency bandwidth employed by communication system 100 during a measuring period, such as a Transmission Time Interval (TTI) (also known as a sub-frame) or a radio frame transmission period. For example, for each measured sub-band, MS 102 may measure a received signal power, a signal to noise ratio (SNR), a carrier to interference ratio (CIR), a signal to noise plus interference power ratio (SINR), or a carrier power over the interference plus noise ratio (CINR) associated with a signal transmitted over a channel utilizing the sub-band and received by the MS, or may measure a bit error rate or a frame error rate associated with such a signal. One of ordinary skill in the art realizes that many channel quality metrics may be measured in determining channel quality and that any such parameter may be used herein without departing from the spirit and scope of the present invention.

Based on the measured channel quality metrics for the sub-bands, MS 102 determines (206) a mean channel quality metric, that is, a first moment of the channel quality metric, preferably a mean SNR, for the frequency bandwidth as is know in the art. Furthermore, based on the channel quality measurements, MS 102 determines (408) one or more second order statistics for the channel quality metric (that is, SNR), and more particularly one or more of a standard deviation of the channel quality metric, that is, a second moment of the channel quality metric, and a variance of the channel quality metric for the frequency bandwidth.

In response to determining a mean and a second order statistic, such as a variance and/or a standard deviation, of a channel quality metric associated with downlink 112, MS 202 reports (210) to RAN 120 the determined channel quality metric mean and second order statistic. Preferably, MS 102 assembles, and conveys to the RAN during the reporting period, and the RAN receives from the MS, one or more channel quality messages that inform of the determined mean channel quality metric, preferably a mean SNR, and the channel quality metric second order statistic, again such as a variance and/or a standard deviation and preferably an SNR variance and/or standard deviation. Based on the reported mean channel quality metric and channel quality metric second order statistic, RAN 120, and in particular transceiver 130 or controller 140, allocates (212) a transmit power for a downlink transmission to MS 102. RAN 120 then transmits (214) a signal to the MS at the allocated transmit power and logic flow 200 ends (216).

Figure 3:
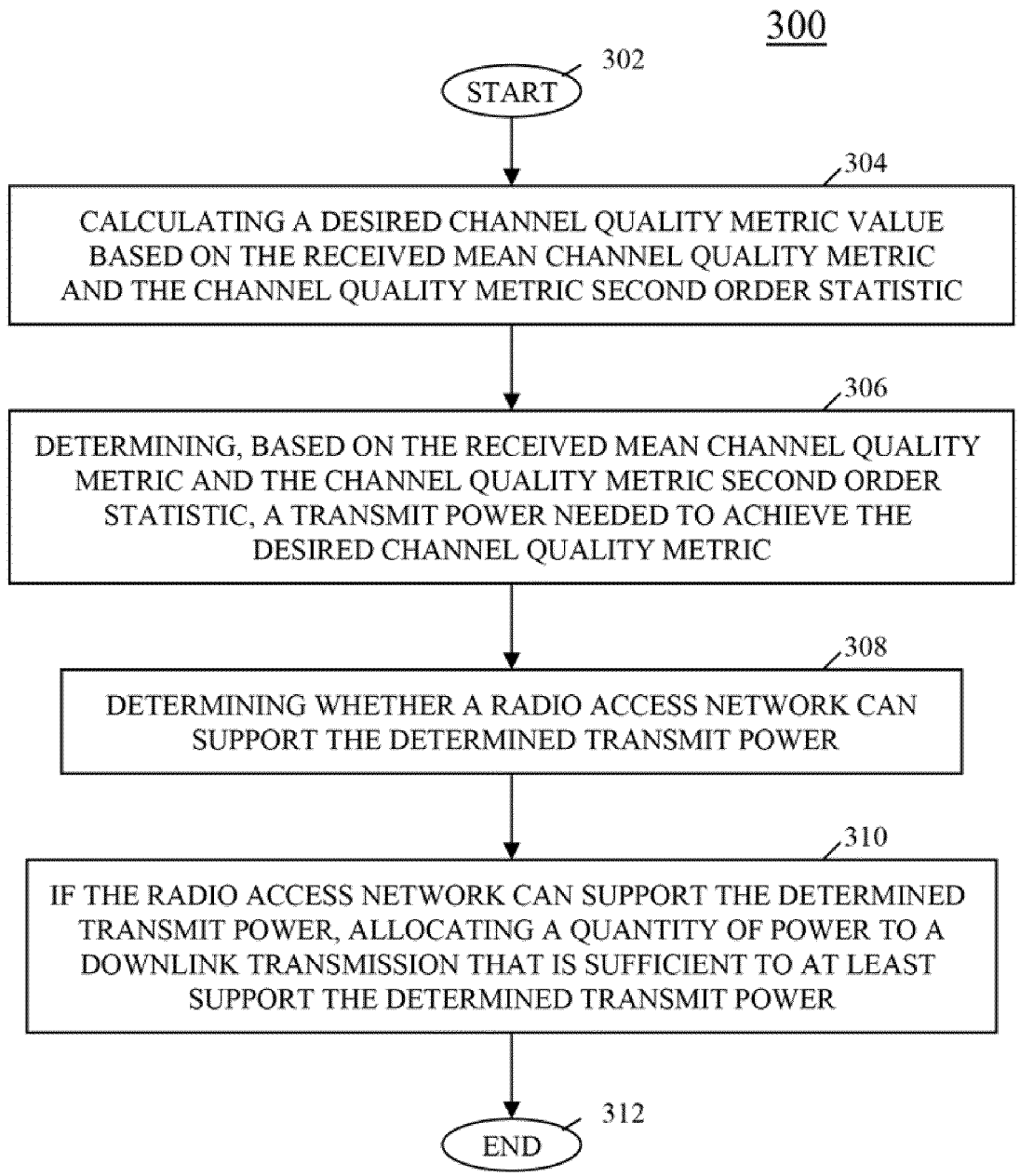
FIG. 3 is a logic flow diagram of a method executed by the radio access network of FIG. 1 to allocate a transmit power for a downlink transmission to the mobile station of FIG. 1 in accordance with an embodiment of the present invention.

Referring now to FIG. 3, a logic flow diagram 300 is provided that illustrates a method executed by RAN 120, and preferably scheduler 146, in allocating a transmit power for a downlink transmission to MS 102 in accordance with an embodiment of the present invention. In allocating a transmit power, RAN 120 determines a minimum transmit power that can achieve a target error rate, preferably a target frame error rate (FER), and allocates at least the determined minimum transmit power. More particularly, logic flow diagram 300 begins (302) with RAN 120 calculating (304) a desired channel quality metric value, preferably a desired, or effective, SNR ($SN_{effective}$), based on the mean channel quality metric, that is, the mean SNR, and the channel quality metric second order statistic, again such as a variance and/or a standard deviation and preferably an SNR variance and/or standard deviation, reported by MS 102. RAN 120 then determines (306), based on the reported mean channel quality metric and channel quality metric second order statistic, a transmit power needed to achieve the desired channel quality metric. RAN 120 then determines (308) whether the RAN can support the determined transmit power, that is, whether the RAN has sufficient available transmit power to provide the determined transmit power and, if so, allocates (310) a quantity of power to a downlink transmission to MS 102 that is sufficient to at least support the determined transmit power. Logic flow 300 then ends (312).

RAN 120 may determine the desired channel quality metric value, target error rate, and transmit power needed to achieve the desired channel quality metric as follows. Exponential Effective SIR Mapping (EESM) is a known link-to-system mapping method that produces an accurate estimation of the Additive White Gaussian Noise (AWGN)-equivalent SNR for frequency selective channels. More particularly, EESM is a method used to estimate demodulator performance in a channel with frequency selective signal and/or noise and that maps power levels and MCS (Modulation and Coding Scheme) levels to SNR values in the AWGN channel domain. This allows using this mapping along with AWGN assumptions (such as effect of an increase in power and CINR/MCS threshold tables) to predict the effect on SNR of MCS and power boosting modifications.

Now suppose that $\gamma_i$, i=1, . . . , N are instantaneous signal to noise ratios (SNRs), wherein N=the number of sampled sub-bands or subcarriers. 'N' is selected such that the bandwidth is sampled adequately in the frequency domain so that the variation in the bandwidth is adequately captured. Then the desired channel quality metric value, preferably a desired, or effective, SNR ($SN_{effective}$), that is used to look up a target error rate, preferably a target frame error rate (FER), according to an AWGN link curve, is calculated as follows, $$SNR_{effective} = -\beta \log\left(1/N \sum_{i=1}^{N} e^{-\gamma_i/\beta}\right).$$

where $\beta$ is a factor as a function of a predetermined, that is, a given, modulation and coding rate and $\beta$ is not considered to depend on Doppler frequency or packet size. Because $\beta$ depends on Modulation-Coding Product Rate (MPR), in order to use EESM to model Incremental Redundancy (IR) retransmissions, RAN 120 has to either store all the instantaneous SNRs reported by MS 102 or live with the inaccuracy of SNR approximations. In the following, a gamma distribution is used to model instantaneous SNRs.

In wireless communications, the Nakagami-m distribution can model both Rayleigh fading and Rician fading with high accuracy and with a simple expression. The Nakagami-m distribution is closely related to the gamma distribution, that is, if the amplitude of the channel gain follows a Nakagami-m distribution then the instantaneous SNR follows a corresponding gamma distribution.

Simulations have shown that the SNRs of fading channels follow a gamma distribution or Weibull distribution very well. As the gamma distribution is closely related to the Nakagami-m distribution, and the gamma distribution is easier to manipulate than the Nakagami-m distribution, so a gamma distribution may be used, instead of a Weibull distribution, to model the instantaneous SNRs on subcarriers of fading channels. The probability density function (pdf) of a gamma distribution is given by $$p_{\bar{\gamma},m}(\gamma) = \frac{m^m \gamma^{m-1}}{\bar{\gamma}^m \Gamma(m)} e^{-\frac{m\gamma}{\bar{\gamma}}},$$

where $\Gamma(x)$ is the gamma function. The gamma distribution probability density function above is determined by two parameters, that is, the average SNR, $\bar{\gamma}$, and m. For a gamma distribution, m=1 leads to a Rayleigh distribution and m=∞ leads to AWGN. 'm' is related to the so-called K-factor in Rician modeling in a close approximation:

$$k = m - 1 + \sqrt{m^2 - m}$$

Now assume $\gamma_i$, i=1, ..., N follows $p_{\bar{\gamma},m}(\gamma)$. Then we have $$E\{e^{-\gamma/\beta}\} = \int_0^\infty \frac{m^m \gamma^{m-1}}{\bar{\gamma}^m \Gamma(m)} e^{-\frac{m\gamma}{\bar{\gamma}}} e^{-\gamma/\beta} d\gamma$$

$$= \int_0^\infty \frac{m^m \gamma^{m-1}}{\bar{\gamma}^m \Gamma(m)} e^{-\gamma\left(\frac{m}{\bar{\gamma}} + 1/\beta\right)} d\gamma$$

$$= \int_0^\infty \frac{m^m \gamma^{m-1}}{\bar{\gamma}^m \Gamma(m)} e^{-\gamma \frac{m}{\bar{\gamma}'}} d\gamma$$

$$= \left(\frac{\bar{\gamma}'}{\bar{\gamma}}\right)^m$$

$$= \left(\frac{1}{1 + \frac{\bar{\gamma}}{m\beta}}\right)^m$$

where $$\frac{1}{\bar{\gamma}'} = \frac{1}{\bar{\gamma}} + \frac{1}{m\beta}.$$

In this case, $$SNR_{effective} = -\beta \log\left(\frac{1}{1 + \frac{\bar{\gamma}}{m\beta}}\right)^m$$

$$= \bar{\gamma} \frac{m\beta}{\bar{\gamma}} \log\left(1 + \frac{\bar{\gamma}}{m\beta}\right)$$

$$= \bar{\gamma} y \log\left(1 + \frac{1}{y}\right),$$

where $$y = \frac{m\beta}{\bar{\gamma}}.$$

It is known that $$\lim_{y \to \infty} y \log\left(1 + \frac{1}{y}\right) = 1,$$

and $$y \log\left(1 + \frac{1}{y}\right)$$

is an increasing function of y. As is apparent from the above equation for $SNR_{effective}$, the larger $\beta$ is, the larger the effective SNR. The gap between the effective SNR and the average SNR, $\bar{\gamma}$, is determined by m and $\beta$, and when y is large, the effective SNR approximates on the left to the average SNR.

Accurate parameter estimation for the gamma distribution is non-trivial. A known equation to determine an average value of 'm' over all N samples, that is, $\bar{m}$, and for use in determining the effective SNR is the log-likelihood function $$\log(\bar{m}) - \Psi(\bar{m}) = \gamma,$$

where $$\Psi(x) \triangleq (\log(\Gamma(x)))'.$$

An averaged value of 'm', that is, $\bar{m}$, then may be calculated as follows, $$\bar{m} = \begin{cases} (0.5000876 + 0.1648852y - 0.0544274y^2)/y, & 0 < y \leq 0.5772, \\ \dfrac{8.898919 + 9.059950y + 0.9775373y^2}{y(17.79728 + 11.968477y + y^2)}, & 0.5772 < y < 17. \end{cases}$$

$$y = \frac{\sum_{i=1}^N \gamma_i^2}{N\bar{\gamma}} + \log\bar{\gamma} - \frac{1}{N}\sum_{i=1}^N \log(\gamma_i^2) - 1$$

However, this is a processing intensive calculation and may impose a significant load on a processor. Therefore, it may be simpler to determine an estimation of $\bar{m}$, that is, $\hat{m}$, that is acceptable for the purposes of the present invention, $$\hat{\bar{\gamma}} = \sum_{i=1}^N \gamma_i$$

$$\hat{m} = \frac{1}{2\left(\log\hat{\bar{\gamma}} - \dfrac{\sum_{i=1}^N \log\gamma_i}{N}\right)}$$

where, again, N=the number of samples. An alternative equation for estimating $\bar{m}$, that is for determining $\hat{m}$, which avoids logarithm calculation is as follows, $$\hat{m} = \frac{E\{\gamma_i\}^2}{E\{\gamma_i^2\} - E\{\gamma_i\}^2}$$

However, other estimators also exist, for example, one estimator uses the estimators given above as starting points and uses an iterative numerical approach to the maximum likelihood solution.

When Hybrid Automatic Repeat ReQuest (HARQ) is used in the downlink transmission, RAN 120 can transmit multiple subpackets in different frames to an MS, such as MS 102, for one payload packet. The MS can feed back the channel quality metric and its second order statistics to the RAN periodically or aperiodically, under the discretion of the RAN or autonomously from the MS. And the RAN can infer the channel quality metric pair (mean and variance of the SNR) for each transmission. Suppose that after 'N−1' transmissions, the HARQ has not terminated yet. The following formula then may be used to determine the transmission power and/or transmission format and the following procedure can be used to avoid storing instantaneous subcarrier SNRs in every transmission and re-transmission of HARQ in deriving effective SNR using EESM method. First, for transmission i, a gamma distribution is extracted from the instantaneous SNRs $\{\gamma_i, 1, \ldots, \gamma_i, L_i\}$, where $L_i$ is the number of symbols in transmission i. $m_i$ and $\bar{\gamma}_i$ are stored, $i=1, \ldots, N$, representing N transmissions in HARQ. $\beta$ in EESM modeling is looked up according to the effective coded modulation rate at transmission N, which is denoted as $\beta_N$, and the effective SNR at a transmission index N then is calculated as $$SNR_{effective,N} = -\beta_N \log(E\{e^{-\gamma_{i,j}/\beta_N}\})$$

$$= -\beta_N \log\left(\frac{L_1}{L_1 + \ldots + L_N}\left(1 + \frac{\bar{\gamma}_1}{m_1 \beta_N}\right)^{-m_1} + \ldots + \frac{L_N}{L_1 + \ldots + L_N}\left(1 + \frac{\bar{\gamma}_N}{m_N \beta_N}\right)^{-m_N}\right)$$

For the downlink transmission, it can be seen that if MS 102 can feed back the estimated m and $\bar{\gamma}$ (average SNR) to RAN 120, then the RAN can have a better control on power allocation and MCS selection. In the estimators of m given above, it can be seen this idea can be pursued in multiple ways: for example, if the SNR variance, $E\{\gamma_i^2\}$, and SNR standard deviation, $E\{\gamma_i\}$, are fed back, then RAN 120 can calculate m, that is, calculate $\hat{m}$, with little difficulty. To reduce the feedback overhead, some kind of normalization and/or quantization can be used.

For the first transmission, the minimum transmit power, $P_{tx}$, to achieve the desired channel quality metric then can be determined based on the following equation, $$P_{tx} e = \frac{m \cdot \beta}{\bar{\gamma}}()^{\frac{SNR_{effective}}{m \cdot \beta}} 1$$

where the value used for 'm' is the above calculated $\overline{m}$ or, preferably, the estimator $\hat{m}$.

For the Nth transmission, the minimum transmit power $P_{tx}$, to achieve the desired channel quality metric then can be determined based on the following equation, $$P_{tx} = \frac{m_N \beta_N}{\bar{\gamma}_N}$$

$$\left(\left(e^{-\frac{SNR_{effective,N}}{\beta_N}} - \left(\frac{L_1}{L_1 + \ldots + L_N}\left(1 + \frac{\bar{\gamma}_1}{m_1 \beta_N}\right)^{-m_1} + \ldots + \frac{L_{N-1}}{L_1 + \ldots + L_N}\left(1 + \frac{\bar{\gamma}_{N-1}}{m_{N-1} \beta_N}\right)^{-m_{N-1}}\right)\right) \Big/ \frac{L_N}{L_1 + \ldots + L_N}\right)^{\frac{-1}{m_N}} - 1.$$

By modeling SNRs using a gamma distribution, a RAN, such as RAN 120, is able to determine a minimum transmit power required to achieve a desired channel quality metric for a downlink transmission to an MS, such as MS 102. In turn, the RAN can determine the desired channel quality metric, and in particular an effective SNR, based on an average channel quality metric, preferably an average SNR, and second order statistics for the channel quality metric, preferably an SNR variance or standard deviation, reported by the MS and assuming a given MCS. As channel quality does not scale in a simple way with transmit power, the present invention permits a RAN to better determine the requisite transmit power for attaining a desired signal quality over a channel in an OFDM frequency bandwidth than is permitted by the single channel quality parameter fed back by the prior art.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for providing channel quality feedback in an Orthogonal Frequency Division Multiplexing communication system wherein a frequency bandwidth is divided into a plurality of sub-bands, the method comprising:
   receiving, by a access network element, a mean channel quality metric and one or more of a standard deviation and a variance of the channel quality metric from a mobile station; and
   allocating, by the access network element, a transmit power for a downlink transmission to the mobile station based on the received mean channel quality metric and the one or more of the standard deviation and the variance of the channel quality metric wherein allocating the transmit power for a downlink transmission including (a) calculating a desired channel quality metric value based on a predetermined modulation and coding rate and the received mean channel quality metric and the one or more of the standard deviation and the variance of the channel quality metric (b) determining, based on the predetermined modulation and coding rates and the received mean channel quality metric and the one or more of the standard deviation and a variance of the channel quality metric, a transmit power needed to achieve the desired channel quality metric value wherein the transmit power is determined based on the following equation, $$P_{tx} = \frac{m \cdot \beta}{\bar{\gamma}}\left(e^{\frac{SNR_{effective}}{m \cdot \beta}} - 1\right)$$

wherein $P_{tx}$ represents the transmit power, $SNR_{effective}$ represents the desired channel quality metric, m and $\beta$ are gamma distribution parameters, and $\bar{\gamma}$ represents the mean channel quality metric.

2. The method of claim 1, further comprising transmitting a downlink signal to a mobile station based on the allocated transmit power.

3. The method of claim 1, further comprising estimating a parameter m of the gamma distribution based on the mean channel quality metric and the one or more of the standard deviation and a variance of the channel quality metric.

4. The method of claim 1, wherein determining a transmit power comprises determining, for an Nth transmission, a minimum transmit power $P_{tx}$ to achieve the desired channel quality metric based on the following equation, $$P_{tx} = \frac{m_N \beta_N}{\bar{\gamma}_N} \left( \left( \frac{e^{-\frac{SNR_{effective,N}}{\beta_N}} - \left(\frac{L_1}{L_1 + \ldots + L_N}\left(1 + \frac{\bar{\gamma}_1}{m_1 \beta_N}\right)^{-m_1} + \ldots + \frac{L_{N-1}}{L_1 + \ldots + L_N}\left(1 + \frac{\bar{\gamma}_{N-1}}{m_{N-1}\beta_N}\right)^{-m_{N-1}}\right)}{\frac{L_N}{L_1 + \ldots + L_N}} \right)^{\frac{-1}{m_N}} - 1 \right)$$

wherein $L_i$ is the number of symbols in transmission i and i=1, . . . , N, representing N transmissions.

5. An access network element operable in an Orthogonal Frequency Division Multiplexing communication system wherein a frequency bandwidth is divided into a plurality of sub-bands, the access network element comprising:
 a transceiver to receive a mean channel quality metric and one or more of a standard deviation and a variance of the channel quality metric from a mobile station and
 a controller coupled to the transceiver, the controller configured to allocate a transmit power for a downlink transmission to the mobile station based on the received mean channel quality metric and the one or more of the standard deviation and the variance of the channel quality metric, to allocate a transmit power for a downlink transmission based on the received mean channel quality metric and the one or more of the standard deviation and the variance of the channel quality metric by (a) calculating a desired channel quality metric value based on a predetermined modulation and coding rate and the received mean channel quality metric and the one or more of the standard deviation and the variance of the channel quality metric and (b) determining, based on the predetermined modulation and coding rates and the received mean channel quality metric and the one or more of the standard deviation and the variance of the channel quality metric, a transmit power needed to achieve the desired channel quality metric value, to assume that the channel quality metric follows a gamma distribution in calculating a desired channel quality metric value and to determine a transmit power by determining the transmit power based on the following equation, $$P_{tx} = \frac{m \cdot \beta}{\bar{\gamma}} \left( e^{\frac{SNR_{effective}}{m \cdot \beta}} - 1 \right)$$

wherein $P_{tx}$ represents the transmit power, $SNR_{effective}$ represents the desired channel quality metric, m and β are gamma distribution parameters, and $\bar{\gamma}$ represents the mean channel quality metric.

6. The access network element of claim 5, wherein the transceiver further to transmit a downlink signal to a mobile station based on the allocated transmit power.

7. The access network element of claim 5, wherein the controller is configured to estimate a parameter m of the gamma distribution based on the mean channel quality metric and the one or more of the standard deviation and the variance of the channel quality metric.

8. The access network element of claim 5, wherein the controller is configured to determine, for an Nth transmission, a minimum transmit power $P_{tx}$ to achieve the desired channel quality metric based on the following equation, $$P_{tx} = \frac{m_N \beta_N}{\bar{\gamma}_N} \left( \left( \frac{e^{-\frac{SNR_{effective,N}}{\beta_N}} - \left(\frac{L_1}{L_1 + \ldots + L_N}\left(1 + \frac{\bar{\gamma}_1}{m_1 \beta_N}\right)^{-m_1} + \ldots + \frac{L_{N-1}}{L_1 + \ldots + L_N}\left(1 + \frac{\bar{\gamma}_{N-1}}{m_{N-1}\beta_N}\right)^{-m_{N-1}}\right)}{\frac{L_N}{L_1 + \ldots + L_N}} \right)^{\frac{-1}{m_N}} - 1 \right).$$

wherein $L_i$ is the number of symbols in transmission i and i=1 , . . . , N, representing N transmissions.

9. A method for providing channel quality feedback in an Orthogonal Frequency Division Multiplexing communication system wherein a frequency bandwidth is divided into a plurality of sub-bands, the method comprising:
 receiving, by an access network element, a mean channel quality metric and one or more of a standard deviation and a variance of the channel quality metric from a mobile station; and
 allocating, by the access network element, a transmit power for a downlink transmission to the mobile station based on the received mean channel quality metric and the one or more of the standard deviation and the variance of the channel quality metric wherein allocating the transmit power for a downlink transmission including (a) calculating a desired channel quality metric value based on a predetermined modulation and coding rate and the received mean channel quality metric and the one or more of the standard deviation and the variance of the channel quality metric (b) determining, based on the predetermined modulation and coding rates and the received mean channel quality metric and the one or more of the standard deviation and a variance of the channel quality metric, a transmit power needed to achieve the desired channel quality metric value and determining, for an Nth transmission, a minimum transmit power $P_{tx}$ to achieve the desired channel quality metric based on the following equation, $$P_{tx} = \frac{m_N \beta_N}{\bar{\gamma}_N} \left( \left( \frac{e^{-\frac{SNR_{effective,N}}{\beta_N}} - \left(\frac{L_1}{L_1 + \ldots + L_N}\left(1 + \frac{\bar{\gamma}_1}{m_1 \beta_N}\right)^{-m_1} + \ldots + \frac{L_{N-1}}{L_1 + \ldots + L_N}\left(1 + \frac{\bar{\gamma}_{N-1}}{m_{N-1}\beta_N}\right)^{-m_{N-1}}\right)}{\frac{L_N}{L_1 + \ldots + L_N}} \right)^{\frac{-1}{m_N}} - 1 \right).$$

wherein $P_{tx}$ represents the transmit power, $SNR_{effective}$ represents the desired channel quality metric, m and $\beta$ are gamma distribution parameters, $\bar{\gamma}$ represents the mean channel quality metric, $L_i$ is the number of symbols in transmission i and i=1, ..., N, representing N transmissions;

estimating, by the access network element, a parameter m of the gamma distribution based on the mean channel quality metric and the one or more of the standard deviation and a variance of the channel quality metric.

10. An access network element operable in an Orthogonal Frequency Division Multiplexing communication system wherein a frequency bandwidth is divided into a plurality of sub-bands, the access network element comprising:
 a transceiver to receive a mean channel quality metric and one or more of a standard deviation and a variance of the channel quality metric from a mobile station and
 a controller coupled to the transceiver, the controller configured to allocate a transmit power for a downlink transmission to the mobile station based on the received mean channel quality metric and the one or more of the standard deviation and the variance of the channel quality metric, to allocate a transmit power for a downlink transmission based on the received mean channel quality metric and the one or more of the standard deviation and the variance of the channel quality metric by (a) calculating a desired channel quality metric value based on a predetermined modulation and coding rate and the received mean channel quality metric and the one or more of the standard deviation and the variance of the channel quality metric and (b) determining, based on the predetermined modulation and coding rates and the received mean channel quality metric and the one or more of the standard deviation and the variance of the channel quality metric, a transmit power needed to achieve the desired channel quality metric value, to assume that the channel quality metric follows a gamma distribution in calculating a desired channel quality metric value and to determine, for an Nth transmission, a minimum transmit power $P_{tx}$ to achieve the desired channel quality metric based on the following equation, $$P_{tx} = \frac{m_N \beta_N}{\bar{\gamma}_N} \left( \left( \frac{e^{-\frac{SNR_{effective,N}}{\beta_N}} - \left( \frac{L_1}{L_1 + \ldots + L_N} \left(1 + \frac{\bar{\gamma}_1}{m_1 \beta_N}\right)^{-m_1} + \ldots + \frac{L_{N-1}}{L_1 + \ldots + L_N} \left(1 + \frac{\bar{\gamma}_{N-1}}{m_{N-1} \beta_N}\right)^{-m_{N-1}} \right)}{\frac{L_N}{L_1 + \ldots + L_N}} \right)^{\frac{-1}{m_N}} - 1 \right)$$

wherein $P_{tx}$ represents the transmit power, $SNR_{effective}$ represents the desired channel quality metric, m and $\beta$ are gamma distribution parameters, $\bar{\gamma}$ represents the mean channel quality metric, $L_i$ is the number of symbols in transmission i, and i=1, ..., N, representing N transmissions.

* * * * *